United States Patent

[11] 3,604,857

[72] Inventor David C. Opferman
Middletown, N.J.
[21] Appl. No. 844,913
[22] Filed July 25, 1969
[45] Patented Sept. 14, 1971
[73] Assignee Bell Telephone Laboratories, Incorporated
Berkeley Heights, N.J.

[54] LINE-ORIENTED KEY TELEPHONE SYSTEM

9 Claims, 7 Drawing Figs.

[52] U.S. Cl. ........ 179/99
[51] Int. Cl. ........ H04m 1/00
[50] Field of Search ........ 179/99

[56] References Cited

UNITED STATES PATENTS

| | | | |
|---|---|---|---|
| 3,385,935 | 5/1968 | Anderson et al. | 179/99 |
| 3,420,961 | 1/1969 | Averill, Jr. | 179/99 X |

*Primary Examiner*—Kathleen H. Claffy
*Assistant Examiner*—Jan S. Black
*Attorneys*—R. J. Guenther and James Warren Falk

ABSTRACT: A key telephone system is disclosed in which only one pair of speech leads extends to the station set regardless of the number of lines connectable to that station set. Data is transferred between the station set and a station module for each set. A line module is further provided for each line from the central office or PBX coming into the key telephone system and a line is assigned or made available to a station set by the inclusion of a cross-point module in a cross-point array. As each line module is enabled in sequence, it first transmits line control information to all the station modules connected thereto and then receives station set control information from all the station modules connected thereto. Station set information is stored in the station module for all lines available to that station set and then transmitted to the station set after all line modules have been enabled in one cycle of operation.

INVENTOR
D. C. OPFERMAN
BY Howard R Popper
ATTORNEY

LINE-ORIENTED KEY TELEPHONE SYSTEM

BACKGROUND OF THE INVENTION

This invention relates to telephone switching systems and more particularly to such systems providing key telephone service.

As is known in the art, key telephone systems are utilized where it is desired that a particular telephone station shall have the capability of direct access to a plurality of lines terminating at that station. Traditionally this has been attained by bringing the line conductors for each of these lines directly to the station set and providing key buttons for these lines. The particular line to be connected to the telephone speech instrumentalities of the station set is then determined by depressing the key button for that line. At the same time, facilities are provided for placing lines in a hold condition when it is desired to pick up a call on a second line without terminating the connection on a first line. Other special services may also be provided.

In the past, when each line had physically to appear in the station set, as many as 50 conductors had to be cabled even in the case of the standard six-button set wherein five buttons are utilized for each of five lines and the sixth button is the hold button. For sets with more buttons, the number of conductors required might be as large as 200.

In an attempt to reduce the number of these conductors, systems have been proposed wherein only two speech conductors are actually connected to each station set regardless of the number of buttons. In these systems, four additional lines are needed for transmitting data to and from the station set as well as for supplying power to it. Such proposals have generally envisioned a central processor which would cooperate with a memory and a switching network to keep track of the states of the various lines and buttons and set up the connections through the network as required for key system operation.

Such an arrangement, however, is characterized by a high initial cost as the processor is required regardless of the number of lines and stations initially in the system. Accordingly, for systems in which the initial number of stations may be small, the centralized processor approach may prove economically unattractive. Further, reliability becomes a major concern.

Accordingly, it is an object of this invention to provide a key telephone system with a reduced number of leads to each station set but wherein the initial cost may be kept low.

It is a further object of this invention to be able economically to increase the number of lines and stations in such a system.

A still further object of this invention is to attain a high degree of reliability.

SUMMARY OF THE INVENTION

These and other objects of my invention are attained in one specific illustrative embodiment wherein the system is organized on a per line basis, rather than on a centralized processor basis. Each line coming into the key telephone system, whether from a central office or a PBX, has associated with it a line module, and similarly, each station set has associated with it a station module. A cross-point array is provided and a line may be extended through to any station set, up to the line capacity of that station set, by merely inserting a cross-point module at the appropriate intersection in the cross-point array.

The line modules and station modules contain digital and analog circuitry for transmitting between them, through the cross-point module, data or control information concerning the state of the various station set key buttons, the station set switchhook and the lines. A timing control circuit establishes time slots for each such item of data.

Each line module is scanned in succession by being enabled by the timing control. The scanning rate is determined by the number of lines and the fastest lamp rate desired. During the time interval when a line module is enabled, it communicates through the cross-point modules with all of the station modules connected to it. The line module first transmits to these station modules control information defining the line activity. Then all the station modules transmit control information back to the line module. This process is repeated for each line module. After all of the lines for a particular station set have been processed, the station module sends lamp and ring data over a data transmission line to the station set and the station module similarly receives button status data from the station set.

Accordingly, the system is organized on a per line basis, thereby allowing the initial cost to be low. The system may easily grow, however, by the addition of individual line, station, and cross-point modules, as required. Each such line, station, or cross-point module is identical for all lines, stations, or cross-points and is associated with only a single line, station, or cross-point; accordingly, the reliability of the system is high since a component failure in any of the modules will at most affect only a single line or station.

GENERAL DESCRIPTION

Figure 1:
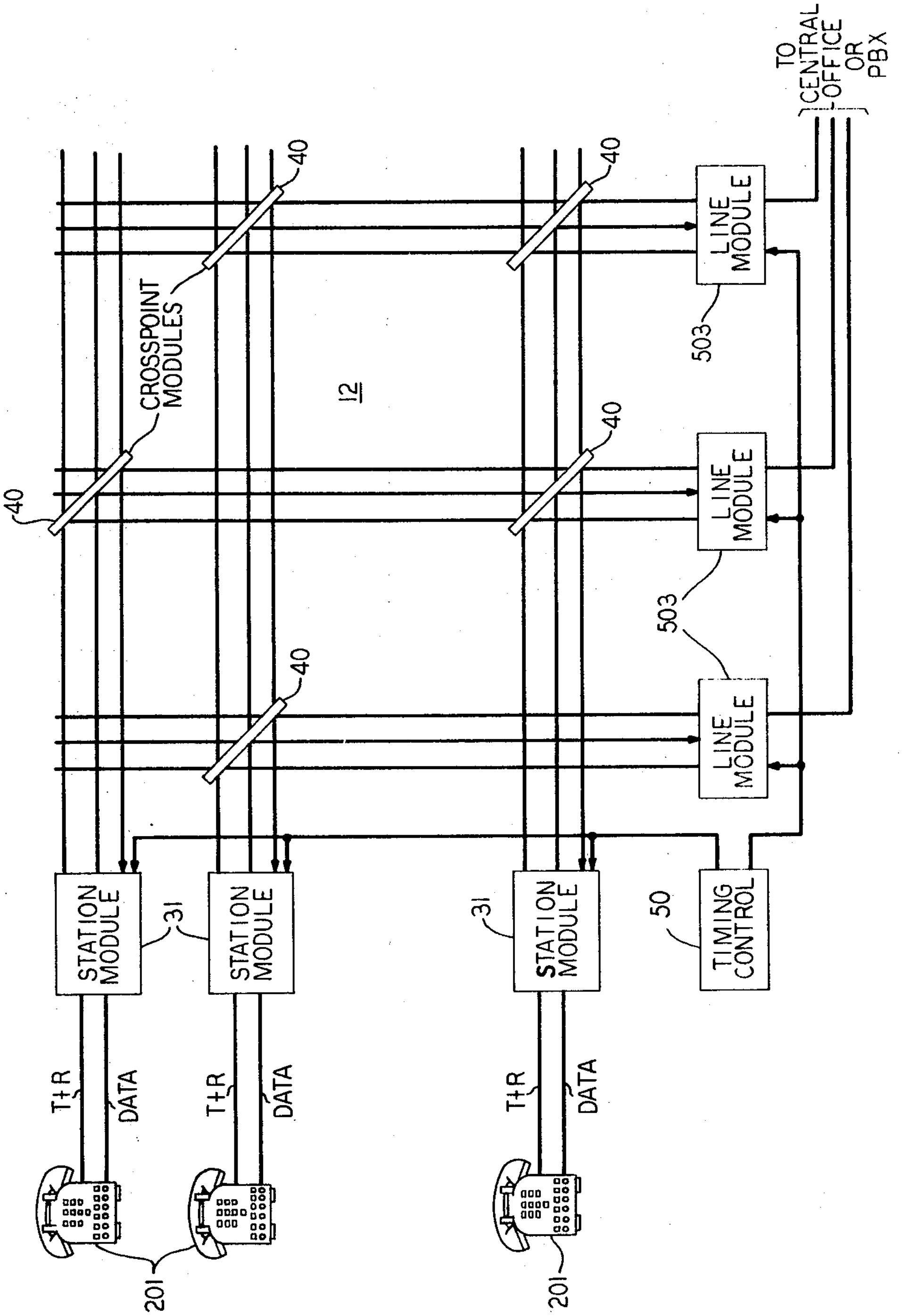
FIG. 1 is a simplified block diagram of one specific illustrative embodiment of my invention.

As seen in FIG. 1 the major elements of this embodiment of my invention include the station sets 201, a station module 31 for each station set, a cross-point array 12 including cross-points 40, a line module 503 for each central office or PBX line, and a timing control 50. A cross-point module 40 is provided on a wired-in basis for each line desired to be connected to a station set. In this embodiment of my invention wherein the station set 201 is provided with six buttons, one of which is a hold button, up to five lines may be connected to each set and, accordingly, up to five cross-point modules 40 may be provided for that station set.

The line module 503 includes analog circuitry for ring detection and hold bridging, circuitry including a transformer for isolating the tip and ring of the line from the cross-point module 40, and logic circuits. It may be pointed out that the cross-point array is an unbalanced network with only the tip leads being connected through from the line module to the station module. The logic circuitry in the line module is used to process and store line information and to communicate with the station module.

The station module 31 includes data transmission circuitry for communicating with the station set and logic circuitry for processing and storing station set information, for sending lamp and ring signals to the station set, and for communicating through the cross-point module with the line module.

The information concerning the status of a station set is not continuously processed; however, it is processed at a speed which will provide the fastest lamp rate and also will not inconvenience the customer. The WINK signal, which is for lines on hold, is the fastest lamp rate, and it requires a 50-millisecond clock. Also, by scanning at this rate, the customer is not excessively delayed. Accordingly, the basic clock of timing control 50 in this specific embodiment is 300 kHz. which provides for a 50-millisecond scanning rate for a system with up to 200 lines and 200 station sets.

During every 50 milliseconds, all of the line modules 503 are sequentially scanned. Each line module is designated a time interval in which it simultaneously communicates with the station modules 31 connected to it through cross-point modules 40. The line module sends signals to the station module indicating whether that particular line is idle, ringing, or on hold. Then these station modules send data which updates the memory in the line module. This data indicates the status of the line at the station set. Two other signals which are also sent during the enablement of the line module are a line button counter advance signal and a cross-point enable signal. The line button counter advance signal enables the station module memory which defines the correct button for the particular line involved. The cross-point enable signal is one of two enabling signals required for turning on the cross-point to connect the speech path from the station set to the line through the cross-point array.

After all of the line modules have thus transferred data with the station modules, each station module sends the lamp and ring data to its corresponding station set 201. At the same time, the station module also receives data from the station set, the data defining the status of the buttons of the station set and the switchhook condition. This data transmission advantageously occurs at the end of the basic 50-millisecond timing interval.

While the timing control 50 sends a line module enabling signal individually to each line module, clock or timing pulses are sent to all line modules simultaneously; however, only the one line module which has a line module enable signal applied to it will perform the logic operations. During the first half of the line module enable signal, line data are sent to all of the station modules that are connected to that line module through cross-point modules. During the second half of the line module enable signal, these station modules all send line information which updates the memory elements of that line module.

Since the line data are sent simultaneously from all the connected station modules, it is to be pointed out that the data are logically ORed at the line module. However, each element of data is sent in a fixed time interval, as determined by a counter logic, and these time intervals are defined according to the priority of the information. Thus if all of the station sets which are connected to a particular line have that line idle, then the information stored in the line module indicates the line is idle. However, if some of the station sets have the line idle, while one has the line off-hook or on hold, then the information stored in the line module is off-hook or hold, respectively. If both of these signals occur in the same line module enablement interval, then the off-hook condition is stored. Accordingly, I provide a priority of line module information storage by arranging the data to be sent from the station modules in a particular sequence and by selectively gating the data received at the line module so that only the highest priority data is stored when data of different priority levels is simultaneously transmitted by the station modules.

Figure 7:
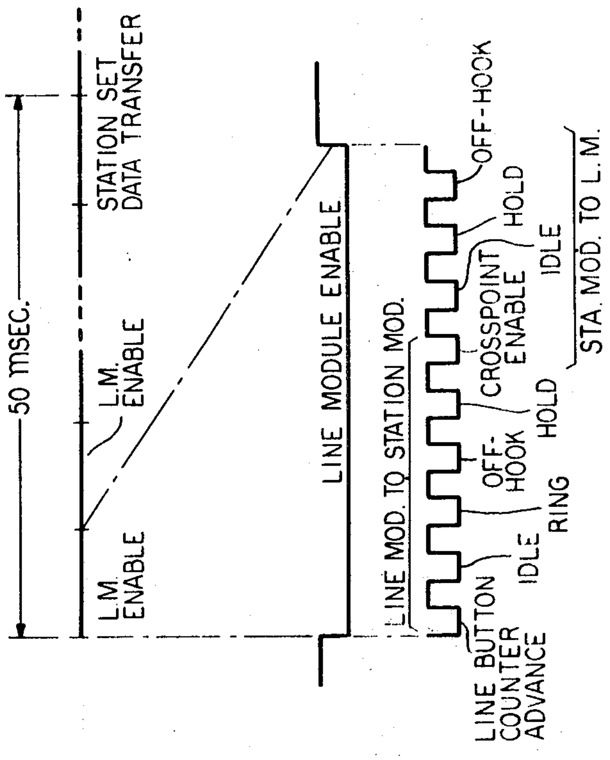
FIG. 7 is a timing plot useful for an understanding of my invention.

FIG. 7 depicts the timing involved in this embodiment of my invention. As seen in the first row of FIG. 7, the 50-millisecond cycle of operation comprises the successive line module enabling pulses, for scanning each line module in sequence, and, at the end of the cycle, the time interval for transfer of data between all the station sets and all the station modules. The line module enable pulse, applied from timing control 50, enables the particular line module during the application of nine timing pulses from the timing control. These nine pulses drive the counter 508 whose nine outputs define the time slots, as depicted on the third line of FIG. 7. The first six time slots, or outputs of counter 508, define the times for control information transfer from the line module to the station module, while the last four define the times for control information transfer from the station module to the line module. The sixth time slot is common and during this interval, cross-point enable pulses are applied from both the station and line modules to enable the cross-point.

DETAILED DESCRIPTION

Figure 3:
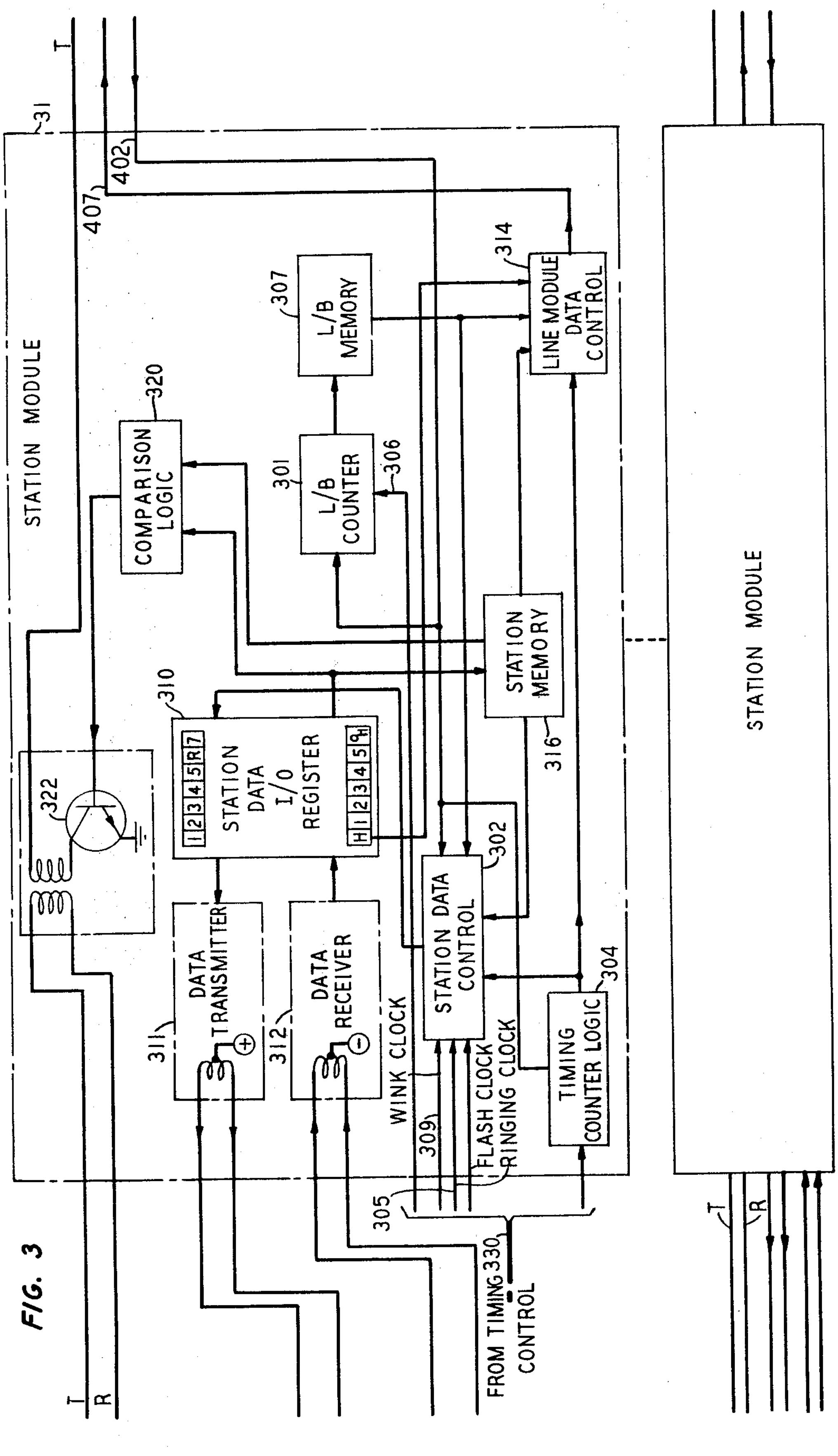
Figure 6:
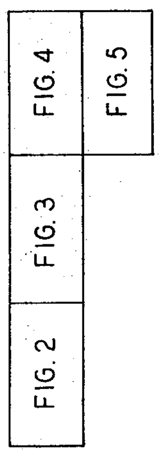

Turning now to FIG. 3, one specific illustrative embodiment of a station module 31 is there depicted. The major elements of the station module include a line button counter 301, a line button memory 307, the station memory 316, the line module data control 314, and the station data input/output register 310. Other elements of the station module will be described subsequently during the description of the system operation.

The line button counter 301, which is advanced by the line button counter advance signal from the line module, as described further below, has five states corresponding to the five lines which can be connected to the station set and the five buttons for that station set. This counter enables the line button memory 307 which stores the desired button number (1 to 5) for each of the lines. The line button memory in this embodiment is advantageously a wire cross-connect memory, though other types of memory may be utilized. However, since the contents of the line button memory need not be changed during operation, it is desirable to employ a form of memory whose contents would not be lost in case of a power failure.

Station memory 316, as hereinafter described, stores the number of the button for the line that was last initiated at the station set and, advantageously, may be a semiconductor flip-flop-type memory.

Station data control 302 controls the station data input/output (I/O) register 310 which temporarily stores the lamp and ring information for the five line buttons of the associated station set and also the data received from the station set.

I/O register 310 contains a seven flip-flop output register, five of whose stages correspond to the five line buttons of the associated station set. The sixth flip-flop is provided to activate the tone ringer 218 at the station set and the seventh flip-flop is a dummy or spare whose contents is always the same and is utilized to make sure that the same number of bits are transmitted to the station set as are received from the station set. The bits which are received from the station set are entered into a seven flip-flop input register. In I/O register 310, one stage of this input register corresponds to each of the five line buttons and the hold button of the station set. The seventh stage registers a 1 bit when the associated station set is in the off-hook condition and a 0 bit when the station is in the on-hook condition.

Figure 2:
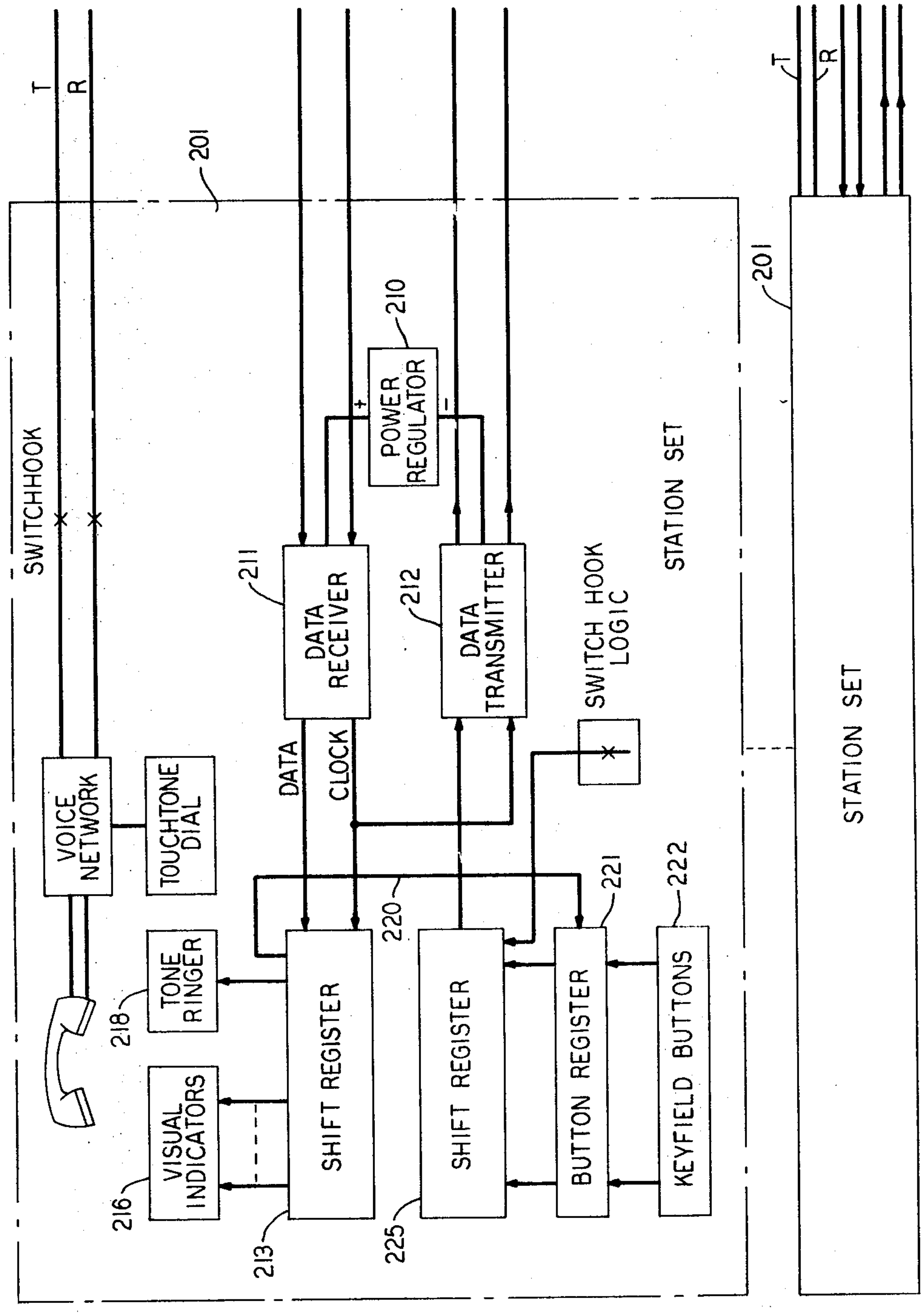
FIGS. 2 through 5, when arranged as depicted in FIG. 6, depict a more detailed schematic of the embodiment of FIG. 1.

Data may be transmitted between the station data I/O register 310 and the station set 201 of FIG. 2 by any of many data transmission schemes known in the art. In this specific embodiment of my invention I employ a data transmitter 311 and data receiver 312, both associated with the station data input/output register 310. Power for the station set is simplexed over the data transmit and receive leads and controlled by a power regulator 210 at the station set. The station set similarly includes a data receiver 211 and data transmitter 212. The data receiver, as is known in the art, generates clock signals from the input data applied to it, which clock signals are applied to control various shift registers and the data transmitter in the station set. Advantageously, transmission to and from the station set may employ bipolar return-to-zero pulses so that transmission at the station set may be self-clocking. In addition, coded formats such as the well-known two-out-of-five format may be employed in each direction.

A flip-flop in the output register of input/output register 310 is set to 1 so that the corresponding button at the station set may be illuminated to display whether the corresponding line is in the holding, ringing, or off-hook condition. For example, assume that button number 1 on the station set is represented by flip-flop 1 in the station data I/O register 310 of the upper station module of FIG. 3. Assume that line module 503 applies a signal to lead 402 during the time slot which indicates that line 502 is in the hold condition. Station data control 302 sets output flip-flop 1 to 1 whenever the wink display clock, provided by a respective lead in cable 330, is active; when the wink clock is "silent," station data control sets output flip-flop 1 to 0. When a line module corresponding to another flip-flop in I/O register 310 is, in turn, enabled, its flip-flop will be set or reset as determined by the time slot signal then appearing on lead 402 and the appropriate display clock gated by station data control 302. After all the output flip-flops in I/O register 310 have been so set or reset, data transmitter 311 transmits their controls to the station set so that the lamp under each button of the station set will be appropriately turned either on or off. Since the lines are scanned at least as fast as the fastest clock, all the output flip-flops in I/O register 310 will each have current information for transmission to the associated station set after a completed scan of that station's line modules.

The data which the station set returns to the station module concerns the status of the line buttons, the hold button and the off-hook condition of the switchhook. This information is entered into the input flip-flops of the station data I/O register. Station button data temporarily stored in the input flip-flops is shifted into station memory 316 and compared by comparison logic 320 with the data priorly in the station memory. If the two sets of data are different, appropriate action is taken. For example, if the previous data in station memory 316 indicated that station button 3 was off-hook and the present data for station button 3 indicates this button to be on-hook, action will be taken to release the cross-point. If the information entered in the input flip-flop of the I/O register is for the hold button of the station set, the information is not shifted to the station memory 316 but is instead directly applied to the line module data control 314. Line module data control 314 controls the transmission of data to the line module.

Figure 4:
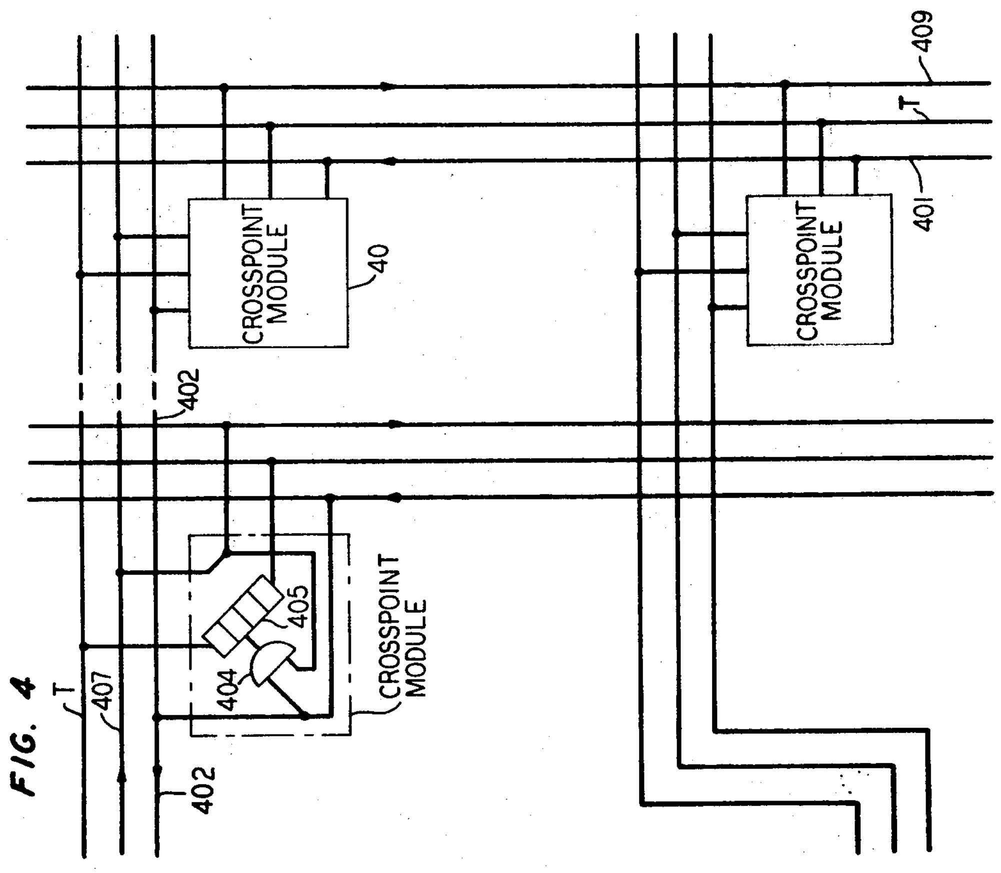

As best seen in FIG. 4, the cross-point module 40 provides three conductors for connection between the line module and each station module connected thereto. Two of these conductors, respectively connecting vertical lead 401 with horizontal lead 402 and vertical lead 409 with horizontal lead 407, provide for direct, unidirectional data transfer between the station and line modules. The third conductor, T, provides for connection of the tip lead of the speech connection through a PNPN cross-point 405 when it is enabled by the simultaneous appearance on the two data lines 401 aNd 407 of signals to enable AND gate 404.

DESCRIPTION OF SYSTEM OPERATION

1. Data Transmission from Line Module to Station Modules

Figure 5:
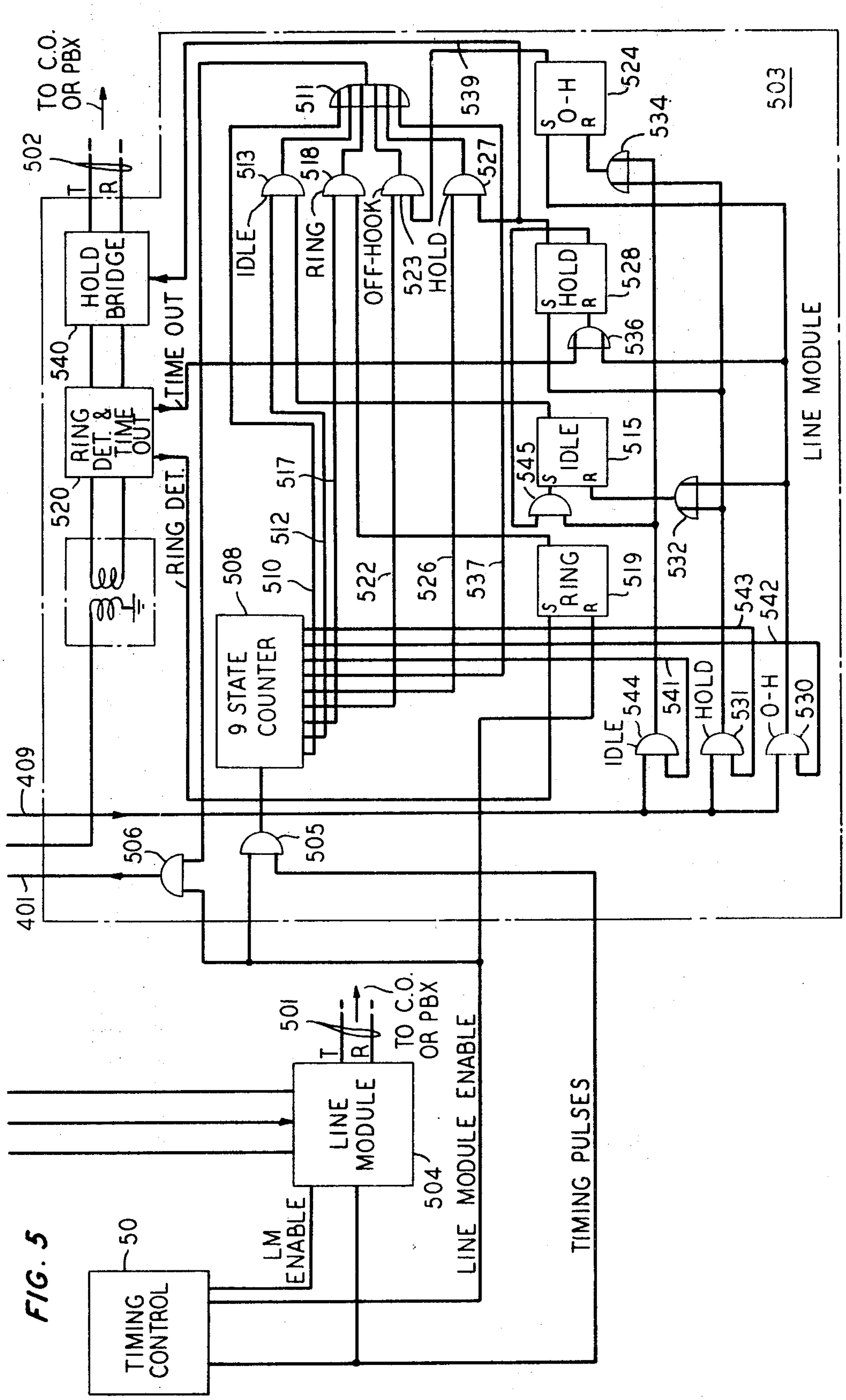

Let us assume at this time that station set 201, FIG. 2, has placed line 502, FIG. 5, connected to line module 503 in the hold state, and that station set 201 is in fact at this time communicating with line 501 through line module 504. In the regular 50-millisecond timing cycle, each line module is scanned in sequence by a line module enabling pulse from timing control 50. In line module 503, this pulse is applied to AND gates 505 and 506. Simultaneously with the line module enabling pulse, timing control 50 applies timing pulses to AND gate 505 which transmits the pulses to the nine-state counter 508. The nine-state counter 508 serves to define the time slots for the operation of the line module and the transmission of necessary data between the line module and the station modules through the associated cross-point module 40.

The first time slot defined by the nine-state counter 508 transmits a line button advance pulse over lead 510 through the OR gate 511 and the AND gate 506, through the cross-point module 40, FIG. 4, over leads 401 and 402 to the line button counter 301 and an eight-state counter within the timing counter logic 304 of the station module 31 of FIG. 3.

The line button advance pulse from counter 508 is applied to the line button counter 301 which is enabled at this time by a distinct timing pulse applied to lead 306 from the timing control 50; accordingly, only the first or line button advance pulse from the line module is gated to operate the line button counter 301. Line button counter 301 keeps track of which line is being scanned by the line module enable pulse. If we assume a standard six-button key set, there could be five individual lines, each assigned to a different button on the set. The line button memory 307, as described above, may advantageously be a wired memory which stores the association of the particular button on the station set with the particular line. The line button counter 301 will therefore be able to count up to the five possible assigned lines.

The line button advance applied to the counter logic 304 initiates the counter therein which will then run synchronously in response to timing pulses over cable 330 from timing control 50 with the nine-state counter 508 of the line module.

Accordingly, in response to the first state of counter 508 in line module 503, the required synchronized timing pulses at the station module have been initiated and the line button counter 301 has been updated to correspond to the particular button of station set 201 (FIG. 2) to which the subsequent data to be transmitted will pertain.

The second state of counter 508 causes a pulse to be applied over lead 512 to an Idle AND gate 513. The other input to the AND gate 513 is from an Idle flip-flop 515 whose state has been set by the data transmitted from the station module in the last scanning cycle, as described further below.

The third state of counter 508 causes a pulse to be applied to lead 517 which partially enables the Ring AND gate 518, the other enablement of which is from Ring flip-flop 519. The Ring flip-flop is set by a pulse from a ringing detector and timeout circuit 520 which is connected to the tip and ring of line 502 from the central office. The Ring flip-flop 519 is reset at the end of each line module scan by the trailing edge of the line module enable pulse from timing control 50.

The fourth state of counter 508 causes a pulse to be applied over lead 522 to the Off-Hook AND gate 523, the other enablement of which is from the Off-Hook flip-flop 524 which has also been set by data from the station module.

The fifth state of the counter 508 causes a pulse on lead 526 to be applied to the Hold AND gate 527, the other enablement of which is from the Hold flip-flop 528.

The sixth state of the counter 508 causes a pulse to be applied over lead 537 directly through the OR gate 511 and the enabled AND gate 506 to provide one enabling signal to the AND gate 404 of cross-point module 40, FIG. 4, which partially enable the PNPN cross-point 405 associated therewith.

As each of the AND gates 513, 518, 523, and 527 is enabled in succession, data is transmitted from the line module 503 to lead 401 and to all of the station modules to which it is connected by the connection in the cross-point network of an appropriate cross-point module 40. This information appears in the station modules on lead 402 and is applied to the station data control 302 where it is identified with respect to its time slot by the timing signals supplied by the eight-state counter within the counter logic 304.

The first time slot signal from the line module to the station modules after the line button advance indicates the idle status of that line. In this specific embodiment of my invention, that signal is not required at the station module; however, as other services are required in the key telephone system, it will be extremely convenient to have the idle signal available at the station module.

The next signal which may be received at the station module from the line module is provided if gate 518 is enabled. This signal indicates whether ringing should be applied to the station set. When present, the ringing signal from the module 503 is applied to the station data control 302 and, under joint control of a synchronous pulse from the eight-state counter in counter logic 304 and a ringing clock enabling signal on lead 305 from the timing control 50, station data control inserts a 1 bit in the appropriate flip-flop of station data input/output register 310.

In the present discussion, however, we have assumed that line 502 is on hold and, accordingly, no ringing signal would be sent from the line module to the associated station modules and the ringing bit in the output register of I/O register 310 would not be set.

The next time slot signal that would be sent from the line module 503 to the connected station modules is the off-hook data bit which is sent if gate 523 is enabled. While under our assumed conditions this bit would not be sent; if it were sent, it would also be received in station data control 302 and identified as an off-hook bit by a synchronous pulse from counter logic 304. Station data control 302, having received the off-hook bit from the line module and having received from the line button memory 307 the number of the line button to which this information applies, applies a signal to the station data I/O register to set the flip-flop in the output register corresponding to the button defined by the line button memory 307. Whenever a station is off-hook and not holding, the lamp at its button should be lit steadily, accordingly, station data control need not employ any clock to reset the bit in the output flip-flop of the I/O register once it has been set.

The next time slot signal that would be transmitted from the line module identifies whether line 502 is in the hold condition. In this instance we have assumed line 502 to be in the hold state and therefore line module AND gate 527 would be enabled and a hold data bit would be transmitted through the various cross-point modules 40 which interconnect the line module to the station modules. At each such station module the data bit appearing on line 402 is received in station data control 302 and is identified as a hold data bit by a synchronous timing pulse from counter logic 304. Station data control receives the button number information from line button memory 307 and sets the flip-flop in the output register of the station data I/O register 310 corresponding to the button number. Station data control 302 sets this flip-flop to 1 if the wink clock is in its active phase when the hold data bit appears on lead 402. If the wink clock is in its silent phase station, data control sets this flip-flop to 0.

2. Data Transmission from Station Modules to Line Modules

After the first five states of counter 508 have resulted in the transmission of data from the line module to the station modules, the sixth state enables the cross-point 405 in the cross-point module. The first enablement to the AND gate 404, as priorly discussed, is applied from counter 508 over lead 537 and through the line module logic to the conductor 401. The necessary corresponding cross-point enable pulse from the station module is applied from the line module data control 314 over conductor 407 under control of the line button memory 307, the station memory 316 and the corresponding timing signals from counter logic 304. The station memory flip-flop in memory 316 for this line is set to contain a 1 if that line is off-hook, and, if the line button memory for this line is also 1, as determined by logic circuitry in the line module data control 314, the cross-point enable signal is sent and the cross-point enabled for the interconnection of the tip leads of the speech path.

The next time slot or seventh state of counter 508 defines the idle condition of the lines associated with that station set. Again, if the station memory flip-flop in memory 316 is reset to 0 for that line defined by the line button memory 307, then that line is idle and the idle pulse is transmitted to the line module over conductors 408 and 409 to the Idle AND gate 544. The AND gate 544 is partially enabled by the output of the counter 508 and, as described above, enablement of AND gate 544 causes the Off-Hook flip-flop 524 to be reset. The Idle flip-flop 515 will be set when AND gate 545 is enabled; the output of this gate is controlled by AND gate 544 and the complement of the Hold flip-flop. The Idle flip-flop 515 is reset through an OR gate 532 whenever either the Off-Hook signal appears at the output of Off-Hook AND gate 530 or the hold signal appears at the output of Hold AND gate 531.

It is to be pointed out that while the above description has been primarily concerned with the idle condition of a line at one station set, in fact all the station modules which are connected through associated cross-point modules to the particular line module 503 are transmitting data at the same time. Accordingly, during the scanning of the one line module the various of the idle, hold, and off-hook flip-flops may be set and reset dependent upon the different conditions at different of the station sets connected thereto. In this respect it is important that the order of the transmitted data be idle, hold, and off-hook so that the indication of any one station set line being off-hook will gain priority and will in effect erase the prior conditions of a different station set line being held or, at the lowest level of priority, idle.

Thus, after an idle data bit may have been sent from any of the lines of the station sets connectable to this line module, the hold information is similarly sent from the station module under control of the counter logic 304 which generates the time slot, the line button memory 307, and the station memory 316 by the line module data control 314. The station memory 316 stores the number of the last button corresponding to a line that was off-hook and then picked up, while the line button memory 307 identifies which line that applies to, and the hold bit in the input register determines whether that hold button has been depressed and is applied to the line module data control 314. The hold bit is transmitted from the station module to the line module appearing on lead 409 only for the last line to have been picked up.

The Hold flip-flop 528 when set, in addition to applying a partially enabling signal to the Hold AND gate 527, also applies a control signal over lead 539 to the hold bridge 540 which provides a hold impedance across the line 502, as is known in the art. When hold flip-flop 528 is reset it provides a signal to partially enable AND gate 545 at the set input of Idle flip-flop 515.

The last item of information transmitted from the station module identifies the off-hook status of the line. If the station memory flip-flop is set, in effect storing a 1 bit, and the hold bit of the input register is a 0, indicating that the line is not on hold, then the line is off-hook and under control of the station memory bit 316, timing counter logic 304, and the identity of that line from the line bit memory 307 an off-hook data bit is transmitted through to the line module. The Off-Hook flip-flop 524 is reset through an OR gate 534 whenever either the Idle or Hold signals are provided by gates 544 and 531 respectively and the Hold flip-flop 528 is reset through OR gate 536 when ring detector and timeout circuit 520 detects that the central office has placed line 502 in the on-hook state or when the Off-Hook signal is provided by gate 530.

As pointed out above, the speech path is established through the PNPN cross-point 405 under control of the simultaneous cross-point enable signals from the station and line modules. As long as the station set is off-hook, that connection remains established. When the station set goes on-hook, that fact is stored in the input register for that line. A comparison logic circuit 320 identifies that the station memory bit for that line in station memory 316 is a 1, while the received data bit for that line is a 0 indicating an on-hook condition. The comparison logic circuit 320 then applies a signal to a control circuit, indicated schematically in the drawing as a transistor 322, which interrupts the hold path for the PNPN cross-point 405 thereby turning it off.

3. Data Transmission Between Station Module and Station Set

The transmission of the data between the station module and the station set as mentioned above involved the data transmitters and receivers 311, 312 and 211, 212. While the data is transmitted between the station modules and the line modules for each line under control of the line module enablement, the data between the station module and the station set is not transmitted until all of the line modules have been scanned so that there is stored in the output flip-flops of the station data input/output register current information for all the lines connected to that particular station set.

My invention is primarily concerned with the control functions involving the transfer of information between the line and station modules and accordingly various different types of station sets may be employed. The station set must be capable of receiving information from the station module and converting that information into the appropriate indications and, conversely, receiving indications and transmitting such information to the station module. One illustrative embodiment of such a station set is indicated in FIG. 2.

As there seen, the lamp and ring data is received from the station module by the data receiver 211. The type of equipments involved in the data receiver 211 and data transmitter 212 will depend on the form of data transmission employed. A particularly advantageous data format is known as Polar Return to Zero in which a positive pulse represents a logical 1 and a negative pulse a logical 0. The data receiver 211 would then convert this format to binary and derive a clock signal which is used to shift the binary data into shift register 213.

Five of the received bits are used to drive the lamps or visual indicators 216 for the five line buttons. A lamp is turned on whenever a 1 is stored in its corresponding register bit. The sixth bit activates the tone ringer 218. The seventh or spare bit may advantageously be utilized via lead 220 to reset the button register 221.

The button register 221 is used to store a button state corresponding to the last button, in the key field buttons 222, that had been pressed at the station set itself. Each time a button is pressed a two-out-of-five code is logically generated and stored in the button register 221. At the outset of receiving lamp and ring data, the contents of the button register 221 are gated into a second seven-bit shift register 225 and switchhook data and also gated into this register.

The derived clock shifts the data in the shift register 225 to the data transmitter 212 which converts the data to the data format utilized for the data transmission.

SUMMARY

Additional station sets and lines may be added readily by the connection to the system of a station module for each added station set, a line module for each added central office or PBX line, and the necessary cross-point modules for interconnection. Further, while a six-button station set has been described, additional lines may be provided at any station set by the connection thereto of an additional station module with the capability of processing six additional lines to the original station module for that station set. One bit of memory is then utilized in the module to indicate whether the line button counter of the first or second module is being advanced.

While a specific cross-point device and data transmission scheme have been described, other cross-point devices and data transmission schemes may readily be employed, including small relays, both latching and otherwise, and other data formats. Similarly, other embodiments of the line and station modules may be devised by those skilled in the art without departing from the spirit and scope of my invention.

What is claimed is:

1. A key telephone system comprising a plurality of station sets each including a plurality of key buttons,
   a plurality of lines,
   a station module for each of said station sets, each said station module including means for transferring data to and receiving data from its associated station set,
   a line module for each of said lines, each said line module including means for sequentially transmitting control information to and receiving control information from said station modules connected therewith,
   cross-point means for interconnecting the station module associated with a station set with those line modules associated with the lines to which that associated station set has access, and
   timing control means at each said line module for defining intervals for the transfer of particular types of information between said line modules and all of said station modules connected thereto.

2. A key telephone system in accordance with claim 1 wherein said cross-point means includes means defining direct connections between said station and line modules and means controlled by signals transmitted over said direct connections between said station and line modules for establishing a speech connection therebetween.

3. A key telephone system in accordance with claim 1 wherein said line module includes memory means for storing the state of the station sets associated with the station modules connected thereto.

4. A key telephone system in accordance with claim 3 wherein said timing control means is connected to said memory means to define an order of priority of the types of information received from said station modules connected thereto.

5. A key telephone system in accordance with claim 1 wherein said station module includes counter means for determining the line button to which said control information received from said line module pertains.

6. A key telephone system in accordance with claim 5 wherein said station module further includes a line button memory for associating a line connected to a line module and a particular button at the associated station set.

7. A line organized key telephone system comprising
   a plurality of lines each capable of exhibiting a plurality of distinct states including the idle, calling, ringing, and holding states,
   a plurality of telephone station sets capable of exhibiting said distinct states,
   a line module for each of said lines,
   a station module for each of said stations,
   a cross-point module for each line and station module which are to be interconnected,
   means for enabling in turn each of said line modules,
   means in each enabled one of said line modules for defining a first series of time slots each corresponding to one of said distinct states during which said line module may transmit information to each interconnected one of said station modules and a second series of time slots corresponding to said distinct states during which said line module may receive information from all said interconnected ones of said station modules,
   memory means at said enabled line module for storing an indication for each of said distinct states, and
   means at said enabled line module for according different levels of precedence to said distinct state information received from said station modules and for controlling said memory means to store only the highest precedence item when more than one level of said information is simultaneously received.

8. A line organized key telephone system according to claim 7 wherein said station modules each comprises:
   means for synchronously receiving said time slot information transmitted from each said line module,
   a plurality of output flip-flops each for storing an item of information for a respective button of an associated telephone station set,
   means for defining display clock signals, and
   means for selectively gating a bit of said time slot information from said receiving means to said flip-flop under control of said display clock means.

9. A line organized key telephone system according to claim 8 wherein said station modules further comprise means for counting each time a connected one of said line modules is enabled by said enabling means, and means controlled by said counting means for controlling said selective gating means to transfer said bit of information to a predetermined output flip-flop.